(12) United States Patent
Ellis et al.

(10) Patent No.: US 9,417,994 B2
(45) Date of Patent: Aug. 16, 2016

(54) SOFTWARE TEST AUTOMATION SYSTEM AND METHOD

(71) Applicant: TurnKey Solutions Corp., Lakewood, CO (US)

(72) Inventors: Dale H. Ellis, Golden, CO (US); Ryan C. Jacques, Helena, MT (US)

(73) Assignee: TURNKEY SOLUTIONS, CORP., Lakewood, CO (US)

( * ) Notice: Subject to any disclaimer, the term of this patent is extended or adjusted under 35 U.S.C. 154(b) by 0 days.

(21) Appl. No.: 14/682,041

(22) Filed: Apr. 8, 2015

(65) Prior Publication Data

US 2015/0286556 A1 Oct. 8, 2015

Related U.S. Application Data

(60) Provisional application No. 61/976,967, filed on Apr. 8, 2014.

(51) Int. Cl.
  *G06F 9/44* (2006.01)
  *G06F 11/36* (2006.01)

(52) U.S. Cl.
  CPC .......... *G06F 11/3684* (2013.01); *G06F 11/368* (2013.01); *G06F 11/3664* (2013.01)

(58) Field of Classification Search
  CPC .................................................. G06F 11/3664
  USPC .......................................................... 717/125
  See application file for complete search history.

(56) References Cited

U.S. PATENT DOCUMENTS

| 5,335,342 | A | 8/1994 | Pope et al. |
| 7,730,452 | B1 | 6/2010 | Li et al. |
| 8,266,599 | B2 | 9/2012 | Bixon et al. |
| 8,549,482 | B2 | 10/2013 | Margalit et al. |
| 8,549,483 | B1 * | 10/2013 | Bridges et al. ................ 717/126 |
| 8,677,320 | B2 | 3/2014 | Wilson et al. |
| 8,881,109 | B1 * | 11/2014 | Bridges et al. ................ 717/125 |

(Continued)

FOREIGN PATENT DOCUMENTS

| EP | 2113874 A1 | 11/2009 |
| WO | 2009108203 A1 | 9/2009 |

(Continued)

OTHER PUBLICATIONS

"A Method of Identifying Untested GUI Components Through Analysis of Existing Tests"; An IP.com Prior Art Database Technical Disclosure; Dec. 11, 2012.*

(Continued)

*Primary Examiner* — Wei Zhen
*Assistant Examiner* — Clint Thatcher
(74) *Attorney, Agent, or Firm* — Neugeboren O'Dowd PC

(57) ABSTRACT

The present disclosure provides methods, systems, and apparatuses for testing software. The method may comprise associating a plurality of controls on a software application screen with testing actions to be performed on the controls, thereby creating a plurality of test steps, and then generating a test component comprised of the plurality of test steps. The method may then comprise comparing the generated test component to a second test component that is associated with a previous version of the software application screen, and displaying, on a user interface, a graphical representation of one or more differences between the generated test component and the second test component.

12 Claims, 12 Drawing Sheets

(56) References Cited

U.S. PATENT DOCUMENTS

| | | |
|---|---|---|
| 2002/0166081 A1 | 11/2002 | Richardson et al. |
| 2006/0184918 A1 | 8/2006 | Rosaria et al. |
| 2008/0222609 A1 | 9/2008 | Barry et al. |
| 2008/0320462 A1 | 12/2008 | Bergman et al. |
| 2009/0125876 A1 | 5/2009 | Bixon et al. |
| 2009/0133000 A1 | 5/2009 | Sweis et al. |
| 2010/0082378 A1 | 4/2010 | Isaacs |
| 2010/0114939 A1 | 5/2010 | Schulman et al. |
| 2010/0281467 A1 | 11/2010 | Arteaga et al. |
| 2010/0325492 A1 | 12/2010 | Isaacs et al. |
| 2011/0214107 A1* | 9/2011 | Barmeir et al. .............. 717/125 |
| 2011/0252405 A1 | 10/2011 | Meirman et al. |
| 2012/0023484 A1 | 1/2012 | Demant et al. |
| 2012/0124495 A1 | 5/2012 | Amichai et al. |
| 2012/0144373 A1* | 6/2012 | Cook ........................... 717/125 |
| 2013/0262934 A1 | 10/2013 | Zhang et al. |
| 2014/0325476 A1 | 10/2014 | Sayers et al. |
| 2015/0082280 A1* | 3/2015 | Betak et al. ................... 717/124 |

FOREIGN PATENT DOCUMENTS

| | | |
|---|---|---|
| WO | 2010004557 A1 | 1/2010 |
| WO | 2014021872 A1 | 2/2014 |

OTHER PUBLICATIONS

Thomas, Shane, "International Search Report and Written Opinion re Application No. PCT/US2015/25008", Jul. 14, 2015, p. 11 Published in: US.

* cited by examiner

ND METHOD

SOFTWARE TEST AUTOMATION SYSTEM AND METHOD

PRIORITY AND RELATED APPLICATIONS

This application claims priority to U.S. Provisional Patent Application No. 61/976,967 filed on Apr. 8, 2014 and titled "Software Test Automation System and Method," the details of which are incorporated herein for all proper purposes.

TECHNICAL FIELD

The present disclosure relates to software testing. In particular, this disclosure relates to the process of creating and updating automated software tests and their associated test assets and test data repositories.

BACKGROUND

More and more companies now create or purchase software applications for their own businesses in order to improve internal processes and customer experiences. As a result of this trend, there is ever-increasing demand not only for the creating of these specialized software applications, but for the testing of these applications as well. In the past, teams of highly-skilled computer programmers (also known as software engineers) were needed to create the applications, and teams of highly-skilled quality assurance professionals were needed to test the applications. Lately, tools have become available that allow companies to buy software solutions and customize particular applications even if they have little or no computer programming experience. However, software application testing remains a more highly technical task.

Testing any kind of customized applications for proper functionality, as well as errors or bugs, may take place at various times during and after the initial development. As applications get updated over time, testing is often repeated. Often, testing during the initial development of a software application and ongoing testing of software updates to the application is time and resource intensive; usually, the ongoing testing requires the extended attention of quality assurance professionals. In order to reduce the time necessary to perform certain tests, certain testing processes have been automated. However, even with the most advanced test automation, individuals with specialized knowledge of computer programming are still needed to troubleshoot automated testing issues. As companies increasingly try to add new software applications and improve existing ones, improvements to the automation of software testing are sought.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

SUMMARY

Figure 1:
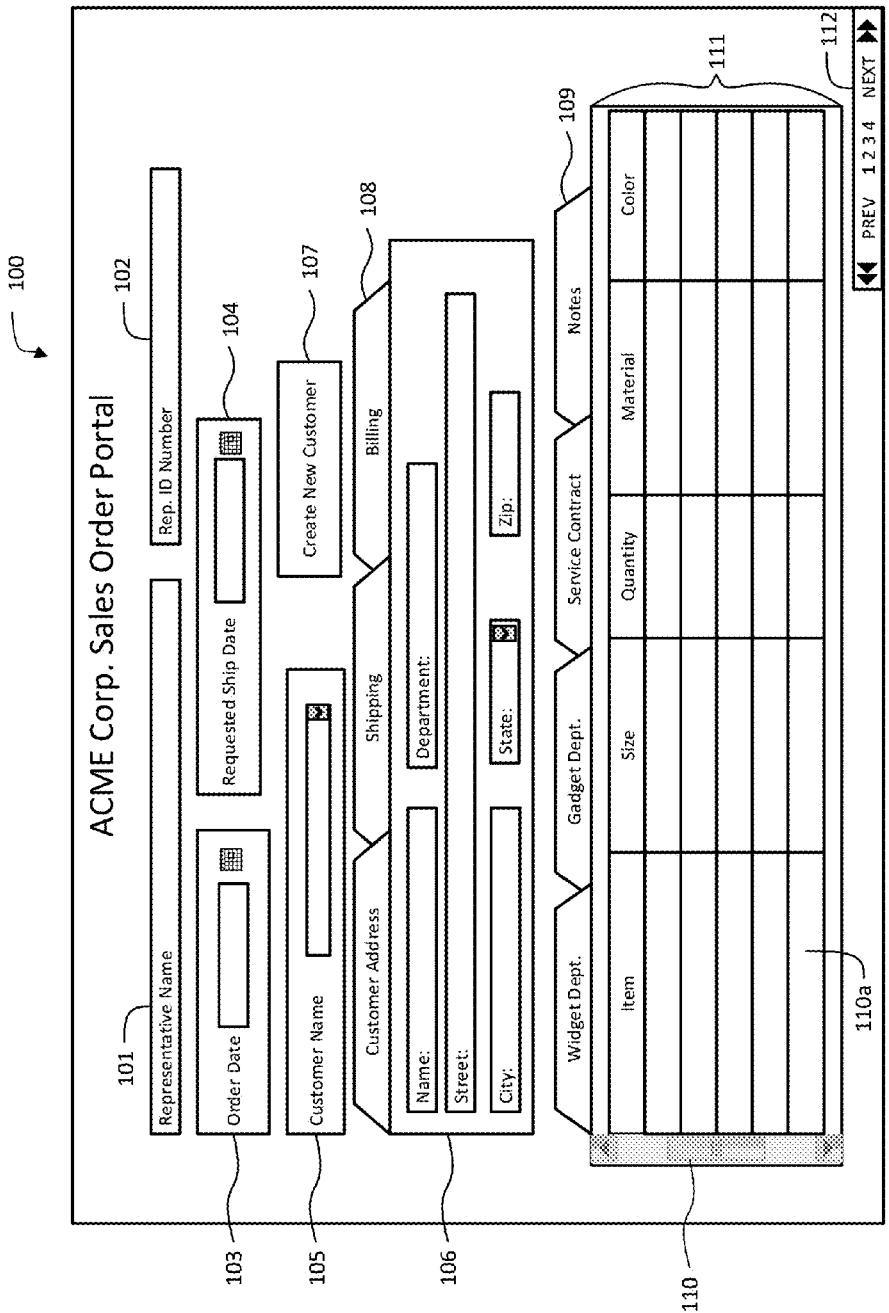
FIG. 1 illustrates a software application screen that may be used for automated testing functions according to embodiments of the present disclosure.

An aspect of the disclosure provides a method for testing software. The method may comprise associating a plurality of controls on a software application screen with testing actions to be performed on the controls, thereby creating a plurality of test steps, and then generating a test component comprised of the plurality of test steps. The method may then comprise comparing the generated test component to a second test component that is associated with a previous version of the software application screen, and displaying, on a user interface, a graphical representation of one or more differences between the generated test component and the second test component.

Another aspect provides a non-transitory, tangible computer readable storage medium, encoded with processor readable instructions to perform a method for testing software. The method may comprise associating a plurality of controls on a software application screen with testing actions to be performed on the controls, thereby creating a plurality of test steps, and then generating a test component comprised of the plurality of test steps. The method may then comprise comparing the generated test component to a second test component that is associated with a previous version of the software application screen, and displaying, on a user interface, a graphical representation of one or more differences between the generated test component and the second test component.

Another aspect provides a system for comprise associating a plurality of controls on a software application screen with testing actions to be performed on the controls, thereby creating a plurality of test steps, and then generating a test component comprised of the plurality of test steps. The system may also comprise comparing the generated test component to a second test component that is associated with a previous version of the software application screen, and displaying, on a user interface, a graphical representation of one or more differences between the generated test component and the second test component.

DETAILED DESCRIPTION

Various aspects are disclosed in the following description and related drawings to show specific examples relating to exemplary embodiments. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Companies today have several options for creating customizable software that meets the needs of their particular businesses. Some companies hire software development firms to develop customized software for them, and some develop software applications in-house. Many more companies, though, address their businesses software needs through companies that provide "enterprise" software solutions. Many businesses need similar kinds of software applications; for example, many need software for accounting, enterprise resource planning ("ERP"), customer relationship management ("CRM") and supply chain management ("SCM"), among other common kinds of general enterprise software. However, many of these businesses also require that these kinds of software be fairly (or sometimes significantly) customizable to their own business processes, and require the development of unique software applications. Companies such as Salesforce® of San Francisco, Calif., SAP® of Newtown Square, Pa., Oracle® of Redwood City, Calif., and IBM® of Armonk, N.Y., among many others, provide enterprise software solutions that allow these kinds of businesses to implement their own software applications with various levels of customization. As a result, businesses that use enterprise software solutions can develop software applications even if they don't have many—or in some cases any—software engineers in-house.

Part of deploying software applications for a business involves a class of software tools called application lifecycle management ("ALM"), some of which may be used for software application test automation. ALM software tools hold test assets, execute tests, and store results, among other functions. There are a few ways to test a software application, one of which is manual testing (when a human being actually clicks or enters data one at a time on application screens) and another of which is automated testing (where software actually executes the tests on application screens). Aspects of the present disclosure relate to automated testing rather than manual testing. Automated testing may also be referred to as "test automation" when appropriate, and hereinafter, when the words "test" and "testing" are used, they may be construed to refer to automated testing rather than manual testing unless otherwise specified. Certain ALM tools allow users to deploy automated testing. Within automated testing itself, there are subtypes. One subtype is called "scripted testing," in which scripts, or blocks of code, are used to automate tests. Scripted automated testing is still very common across all software platforms, and requires computer programmers to write and implement. A newer type of automated testing is known as "keyword" testing, which allows scripts (code) to be abstracted into text and features that are more easily understood by non-programmers. Often, the employees or work groups at a company that are tasked with testing a company's application are individuals with a high level of knowledge about the company's internal processes, but don't necessarily have software development backgrounds. For example, a work group might be tasked with testing a particular customer relationship management software. That group may be comprised of sales people, customer service representatives, account managers, project managers, and others who know exactly how the features and functions the company needs in that software should work. These users may be known as "subject matter experts" for the purposes of this disclosure. Keyword-based automated testing may be used by subject matter experts, and aspects of the present disclosure pertain specifically to improvements to keyword-based automated testing.

Most software applications have various buttons, tabs, fields, and other visually displayed functions. For the purposes of this disclosure, the various buttons, tabs, fields, and other visually displayed functions may be referred to as "controls," to reflect that software application end users may use them to control the functions or operations of the application itself. In the art, controls are also known as "objects," but in order to distinguish between these objects on an application screen and the common meaning of the word "object" in computer programming (e.g., "object-oriented programming"), this disclosure will use the word "control" to mean a discrete, visible, functional unit on a software application screen.

FIG. 1 shows an example of an application screen 100 as known in the art. The application screen 100 may have several controls, such as manually-typed entry fields 101 and 102, and manual-entry-field-plus-date-selectors 103 and 104. When a user interacts with a given control, that interaction may be known as an "action." Correspondingly, test actions can be used to emulate user actions. Manually typing in an entry field is an example of an action. The application screen 100 may also have one or more drop-down menus such as the customer name drop-down menu 105, which may contain a list of possible user selections. The user selecting one of the customer names is another example of an action. Other examples of controls on an application screen include buttons such as the "Create New Customer" button 107. A user may perform the action of clicking on the button, which may cause, for example, another window to pop up. Automated testing may be used to perform the click and verify whether the other window actually pops up.

Additional controls may include multiple tabs 108 and 109, a scroll bar 110, a grid 111, and links 112. Any number of known and yet-to-be-implemented controls may be tested in accordance with aspects of the present disclosure. Though the application screen 100 shows an example of a sales order application, any type of enterprise software application, such as ERP, CRM, SCM, accounting, human resources, or other software applications may be used in accordance with aspects of the present disclosure. Further, although reference is made to software applications that are provided by enterprise software companies and customized within the end-user company, aspects of the disclosure also apply to testing of software that is completely custom-developed, such as by a specialized software development firm or in-house.

Applications such as the one containing application screen 100 are often customized by an end user at a company. For example, a company may purchase a software package or suite containing various sales applications, including applications for taking sales orders, but a software engineer at that company (or hired by that company) may customize the various controls such that each application screen is set up to meet the particular needs of the business. In the example of application screen 100, a software engineer may be able to add create new customer button 107, or add multiple order screen tabs 109. In fact, a company may be able to add, remove, create, or move any and all of the controls in an application. One given application may have a number of versions that appear differently based on the employee that is using it. For example a field sales representative may have different functions on their version of a sales application than the sales manager or sales director. A regular employee may see one version of an expense report application, but the accounting department may have a different version of the same application.

Creating a customized application and updating it requires the expertise of software engineers. Testing a new customized application using test automation and maintaining test automation on updated applications can also be a highly technical process often requiring the expertise of skilled quality assurance professionals, if not software engineers. Those with skill in the art will appreciate that creating and maintaining test automation used for the testing of application screens such as application screen 100 can be time consuming. One critical type of testing is functional testing, which as the name describes, tests that the application functions as intended. Aspects of the present disclosure relate to functional test automation (as opposed to load or stress testing). Among the challenges of testing applications is the need to test the functionality of many controls given so many possible variations of inputs. It may be simple to test a control that has a single function; for example, to test the "create new customer" button 107, the test step would be to click on the button and to make sure a new window pops up. However, testing other controls is more complicated. For example, testing a whole grid may require testing the specific kind of data that may be entered by various users into a particular section of the grid. In the grid 110, a user may enter a name of one of the company's items in the items list 110a. There may be numerous possibilities of entries by a user. The company may have hundreds or thousands of items for sale. Further, a particular sales order may have just one line item on a given order, or it may have three, or eight, or a hundred. Other screens in this application may have similarly numerous possibilities. Ideally, to test the possible entries into a given field or control, the tester can use actual data related to the functions of the company. The items list could be populated with actual items the company sells. A human resources application could be populated with names of actual employees. An accounting application could be populated with actual vendors or invoice numbers. A supply chain management application could be populated with actual lot numbers. The method of using such data to test applications is known as "parameterization." Parameterization involves associating a test step with a particular column in a sheet of data (known as a data sheet or data repository), and using the rows of data in the particular column to enter into the control of the test step. Parameterization will be described in further detail later in this disclosure.

A related concept to parameterization in automated testing is known as "data-driven" testing. As discussed previously, parameterized tests have associated data repositories. Data-driven testing means that an engine pulls the testing data from the data repository, analyzes it, and based upon that analysis, drives or changes the flow of testing to properly match the data. For example, the engine decides which controls to use and in what order, which screens to access or use and in what order, among other decisions. Essentially, the existence of the data drives whether a particular step gets a test action executed upon the step. Steps that are not parameterized (i.e., that are not associated with a column of data) do not get tested via an engine of data-driven testing, although the non-parameterized steps may be tested via another testing engine.

Data-driven testing and parameterization allow companies to test many iterations of actual-use scenarios. It is often beneficial for companies to find bugs in software during testing as opposed to finding out that users of the software in the organization are having a problem with a particular function. For example, a field sales representative might discover that a particular lot number that should be available for selection when she goes to place an order, or she may discover that if she selects a particular lot number, other fields that should automatically populate do not do so. It would be more productive if such an error could be found during testing. However, because there are often so many possibilities for individual data across a business organization, automation of these data-driven tests is essential in order to make data-driven testing worthwhile.

In the field of automated software testing, one strategy to automate tests is to create "test assets" and store them for future use. The term "test asset," as used herein, may be a blanket term that encompasses all the terms in the following hierarchy. The hierarchy is described from the smallest unit to the largest, and comprises test actions, test steps, test components, test cases, and test sets. A test "action," as described herein, may comprise an instruction or input that is executed on an individual control itself. A test action may be executed on a particular control in order to ensure that the particular control creates or performs its expected output or result. As a simple example, a testing action may be an instruction that emulates when a user clicks on a button (such as the "create new customer" button 107) on a user interface. The control may be the button itself. The control may be designed to open another screen of an application upon being clicked by a user. If the testing action (the instruction emulating a click) causes the object (the button) to perform the desired action (opening another screen), then the testing action is successful.

Figure 2:
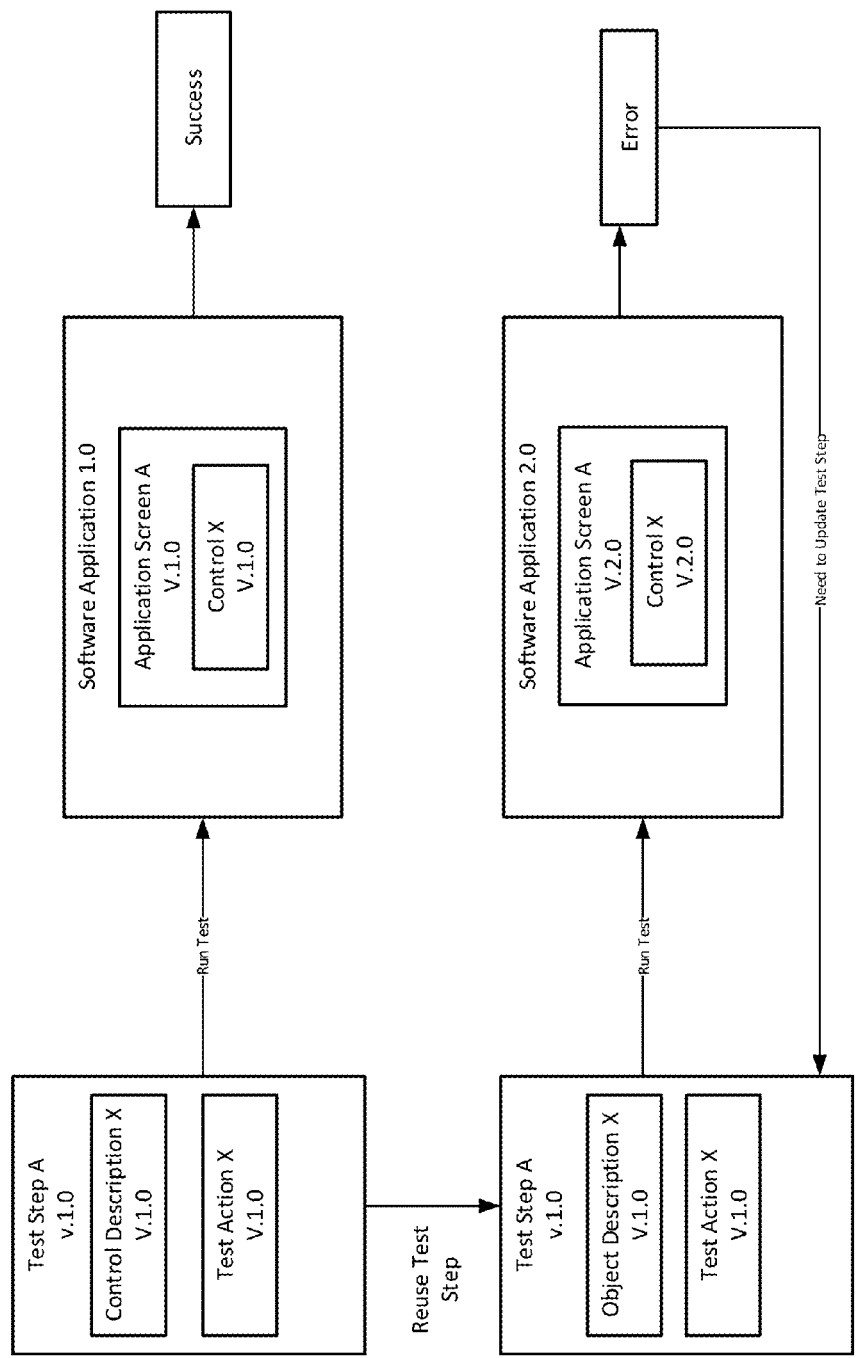
FIG. 2 illustrates how test steps may be used in automation on prior versions and updated versions of software applications.

The next largest unit of testing may be referred to as a test "step." A test step may comprise at least a testing action and a description of a control on an application screen. A test step may, in some instances, also comprise a value. The value may comprise one of a "constant" or a parameter. A value may comprise a constant when the same value is to be entered into the control as part of the step every time the test is run. For example, a test step wherein the value is a constant may comprise one test action of "entering a number," one description of a control such as "manual entry field," and one constant such as the number "1," which is to be entered in that manual entry field every time the test step is executed, without variation. In contrast, a step wherein the value is a parameter may comprise one test action of "selecting" a customer name, a description of a control such as a "drop down menu," and a parameter which references a particular column in a data repository such as the "customer name" column. Details regarding how the steps are parameterized will be described later in this disclosure Before describing the rest of the test asset hierarchy, it is useful to illustrate how automated test steps may need to be updated. In aspects of the present disclosure, these individual test steps may be created automatically using a rules base, which will be described later in the disclosure. FIG. 2 shows a logical block diagram of a software application 1.0 on which a particular test step A may run a test. Software application 1.0 is labeled as such to denote that it is a first version of a particular application, as is known in the art. It is customary in the art to label later updated versions of particular software with higher numbers, such as 1.1, 1.2, 2.0, etc. In this example, software application 1.0 has a particular screen A with a control X. Application screen A and control A are also denoted as (v.1.0) (i.e., version 1.0) to show that they correspond with the same version of the software application 1.0 itself. To test control A (v.1.0), a test step, such as test step A (v.1.0) depicted in FIG. 2, may have been created as part of a software testing program in order to verify that the particular control A (v.1.0) would run as desired by the creator of the application for a given operation of the control. Application screen A (v.1.0) may contain one or more particular controls, such as control X (v.1.0). In order for a corresponding test step, such as test step A (v.1.0) to test control X (v.1.0), there may be a corresponding "control description" and "test action" that is associated with a particular object. In the prior art, a control description and a test action may have been associated manually, by a highly skilled software tester.

In the prior art, one way to automate testing is to save the previous test step A (v.1.0) and reuse it on an updated version of the software application, such as software application 2.0 in FIG. 2. When the software application is updated to version 2.0, the control X (v.2.0) may be the same or different from control X (v.1.0). The previous test step A (v.1.0) may then be used to test control X (v.2.0). In some cases, the previous test step A 1.0 may work to test the control X (v.2.0). However, in other cases the update to the control X (v.2.0) may require an update to the test step A 1.0. This may become apparent if an error occurs as a result of running the test step A (v.1.0) against the control X (v.2.0).

Several potential errors can occur when running test step A (v.1.0) against control X (v.2.0). One type of error would occur if the object description X (v.1.0) no longer accurately described the object X (v.2.0). In this case, in the prior art, the object description would need to be manually changed. An additional step in the prior art would be for the user to manually select and associate a new test action with the new control X (v.2.0) and new control description X (v.2.0). The new test action may be the same or different from test action X (v.1.0), but for purposes of illustration, the new test action shall be designated test action X (v.2.0).

Another type of error might occur if a control is completely missing from the application screen. For example, in application screen A (v.2.0), there may not be a control X at all. In this case, running the test step A (v.1.0) would also cause an error. To remediate this error, the user would have to identify that the error was caused by the missing control X. Then, the user would have to remediate the error by manually identifying and deleting associated control description X (v.1.0) and testing action X (v.1.0) from test step A (v.2.0). Another type of error could occur if the object X (v.2.0) were in a physically different location on the display/function A (v.2.0). In such a case, the user would have to figure out that the object description X (v.1.0) was still applicable, but that the position would have to be updated for object description X (v.2.0) to work properly. After the user has identified and manually remediated the errors associated with test step A (v.1.0) and effectively updated it to test step A (v.2.0), then the user must re-execute the updated test step to ensure it works.

The prior art process of updating test assets as described with reference to FIG. 1 has numerous disadvantages. For example, the process of locating the source of each individual error, remediating it, and then re-executing the test step can take a long time. Often, several cycles of locating, remediating, and re-executing are required in order to eliminate all errors from just one particular test asset Additionally, though the example in FIG. 2 shows just a control description and a test action as part of a test step, there may be additional parts to a test step that need updating. The time and effort required is further multiplied by the number of test assets that require updating. Not only does the process take a long time, but it requires a high degree of skill to perform. The process of troubleshooting the cause of errors requires being able to read the output of the testing tool, which can be written in a highly technical or cryptic manner. As a result, users of the prior art automated testing systems often required not only a software development background, but also specialized knowledge of test automation and the core technology underlying software user interfaces.

Even for skilled users with software testing automation expertise, the process of troubleshooting and remediating can still be error-prone. It may still be easy to make mistakes when analyzing errors, and easy to make mistakes while performing remediation activities. Such errors are not discovered until the test asset is re-executed following the remediation, which can add to the time required to fully update each test asset. Naturally, less experienced software testers may be less efficient at manually updating test assets compared to more experienced software testers. Aspects of the present disclosure allow for software test automation to be implemented more easily by subject matter experts and software engineers alike.

Referring back to the hierarchy of test assets, the next largest unit of testing may be referred to as a test "component." A test component may comprise one or more test steps that cover multiple controls on one application screen. In many embodiments (though not all), a test component may comprise all the test steps for all the controls on a particular application screen. In many other embodiments, a test component may comprise a particular region of a screen.

The next largest unit of testing may be referred to as a test "case," which may comprise a plurality of test components. Multiple test components may be grouped into test cases based on several different criteria. For example, several related application screens may be grouped into one test case. Alternatively, the same application screen, or slightly different application screens across several variations of the application across an organization may be grouped into a test case;

for example, if a similar sales order screen appears for all field sales reps, all managers, and all internal order fulfillment employees, all those screens may be included in a test case.

The largest unit of testing may be referred to as a test "set." A test set may comprise a plurality of test cases. A test set may comprise, for example, the test cases, components, and steps corresponding to all the application screens in one entire application. However, other ways of organizing test sets and cases are contemplated. For example, a test case could be the test assets for all application screens in one particular version of the application, such as the sales order application specifically for the field sales reps, and a test set could be the test assets for all the different versions of the sales order application throughout the organization. Though the terminology for the test assets described herein are divided according to this particular naming convention, other names may be used without departing from the scope of the disclosure.

Test components (which are often all the test steps of one particular application screen) are a useful unit of size with which software testers can work. One application screen of a particular application is likely to have controls that are logically or sequentially tied together; therefore, it is useful to test all the controls on the application screen, or a region thereof, at once. An aspect of the present disclosure is that new test components may be automatically created and automatically updated. There are two "modes" in which components may be created and updated in accordance with the present disclosure. The first mode is known as "creation mode," wherein various components are created for automated testing by a user for the first time. The second mode is known as "maintenance mode," wherein components are updated in order to properly test updated controls on a previously automated component. There are many advantages to updating components according to the present disclosure. In the prior art, there exist repositories for controls on a given application screen. For the purposes of this disclosure, these may be known as "control repositories" (or "object repositories" in the art). Control repositories may contain lists or descriptions of all the controls and their orders in a given screen or application. These control repositories may have been created via the initial creation of a test automation asset, may be stored in a memory, and may be accessed by aspects of the present disclosure to assist in the creation of new automated test assets. They may be stored in known database, worksheet, and other repository formats, including those known and existing and those yet to be created.

Figure 3:
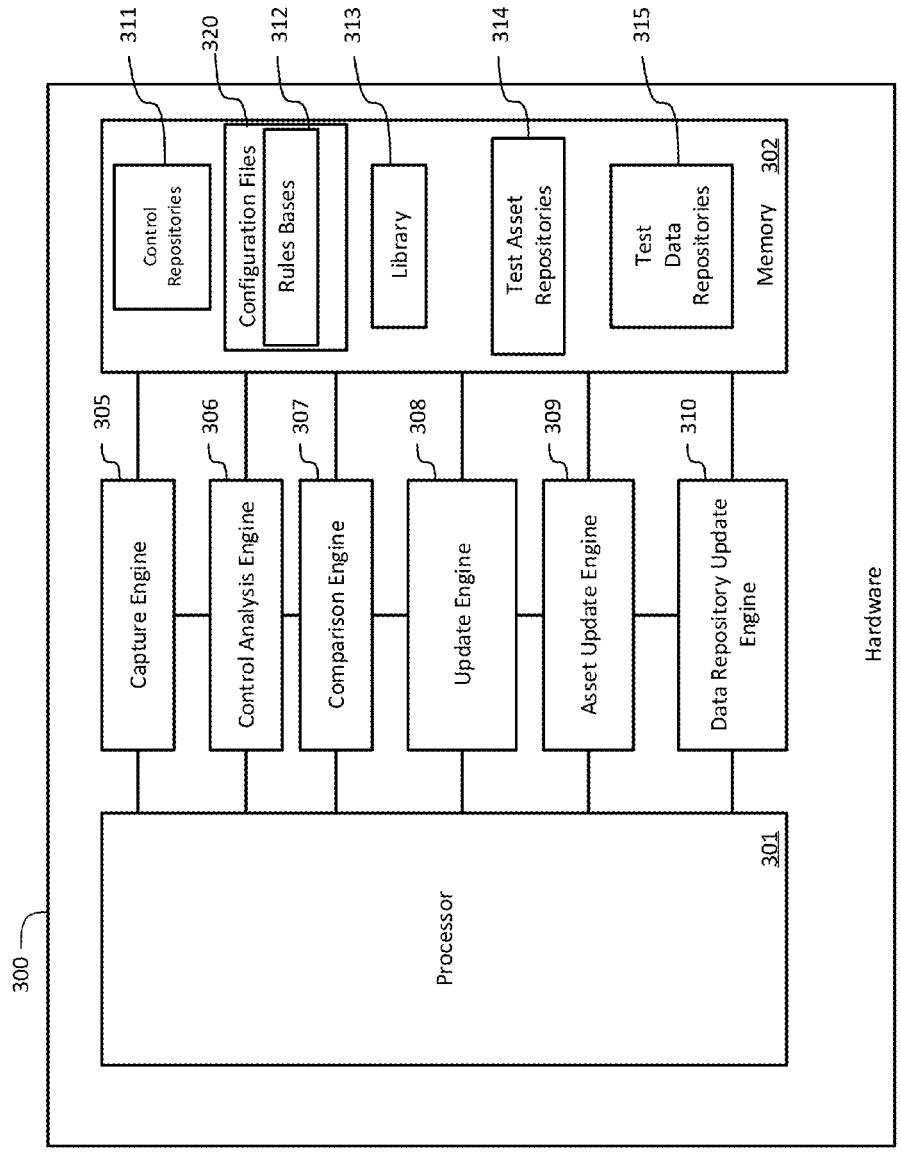
FIG. 3 is a functional block diagram of engines that may implement aspects of the disclosure.

An aspect of the disclosure is that a user may create an automated, data-driven test component through the capturing of controls on an application screen via a capture engine. FIG. 3 depicts a logical block diagram of hardware that may implement aspects of the disclosure. FIG. 3 shows a hardware component 300, a processor 301, and a memory 302. The memory 302 may store various files, libraries, and repositories, including control repositories 311 described previously. The memory 302 may also store a rules base 312 which may work in conjunction with a library 313, which will be described later in this disclosure. The memory may also store test asset repositories 314 and test data repositories, which will also be described later in this disclosure. Various functional blocks may perform aspects of the disclosure in conjunction with the processor 301, the memory 302, and with the other functional blocks.

For ease of reference, the following functional blocks in FIG. 3 will be described here generally, with further detail on each occurring later in the disclosure. A Capture Engine 305 may capture control descriptions on one or more application screens. A Control Analysis Engine 306 may analyze captured control descriptions and associate them with testing actions. The control analysis engine 306 may perform the association based on the rules base 312, and the output of the association may be a test asset containing control descriptions and associated testing actions. A Comparison Engine 307 may compare the control description and associated testing actions within a new test asset to a previously existing test asset and allow for these changes to be accepted or rejected. An Update Engine 308 may implement the changes identified and accepted by the comparison engine 307 into the prior test asset. An Asset Update Engine 309 may search all test cases and test sets within the test asset repositories 314 to identify all locations where the prior test asset is utilized and may replace all instances of a prior test asset with the updated test asset. A Data Repository Update Engine 310 may locate where all test data repositories 315 utilized by all affected test assets are located and update these to match the updated test asset.

Automatic Creation of Components

In order to automatically create test components, in some embodiments, the capture may be done all at once on a screen, by selecting a function on a user interface to "learn" an entire screen. In other embodiments, the capture may be accomplished through a more interactive user interface that allows a user to select individual controls by clicking the controls on an application screen or by selecting an area of the screen and capturing all controls within that area. There are several existing ways to simply capture all the controls on a screen in the prior art and save them, rather than using existing control repositories. In the prior art, a control repository could be used to create test components, but a user would have to manually associate a test action with each control. Once all the test actions were associated with all the controls, the end result would be a test component. It can be tedious to use control repositories to manually create automated test components.

Figure 4:
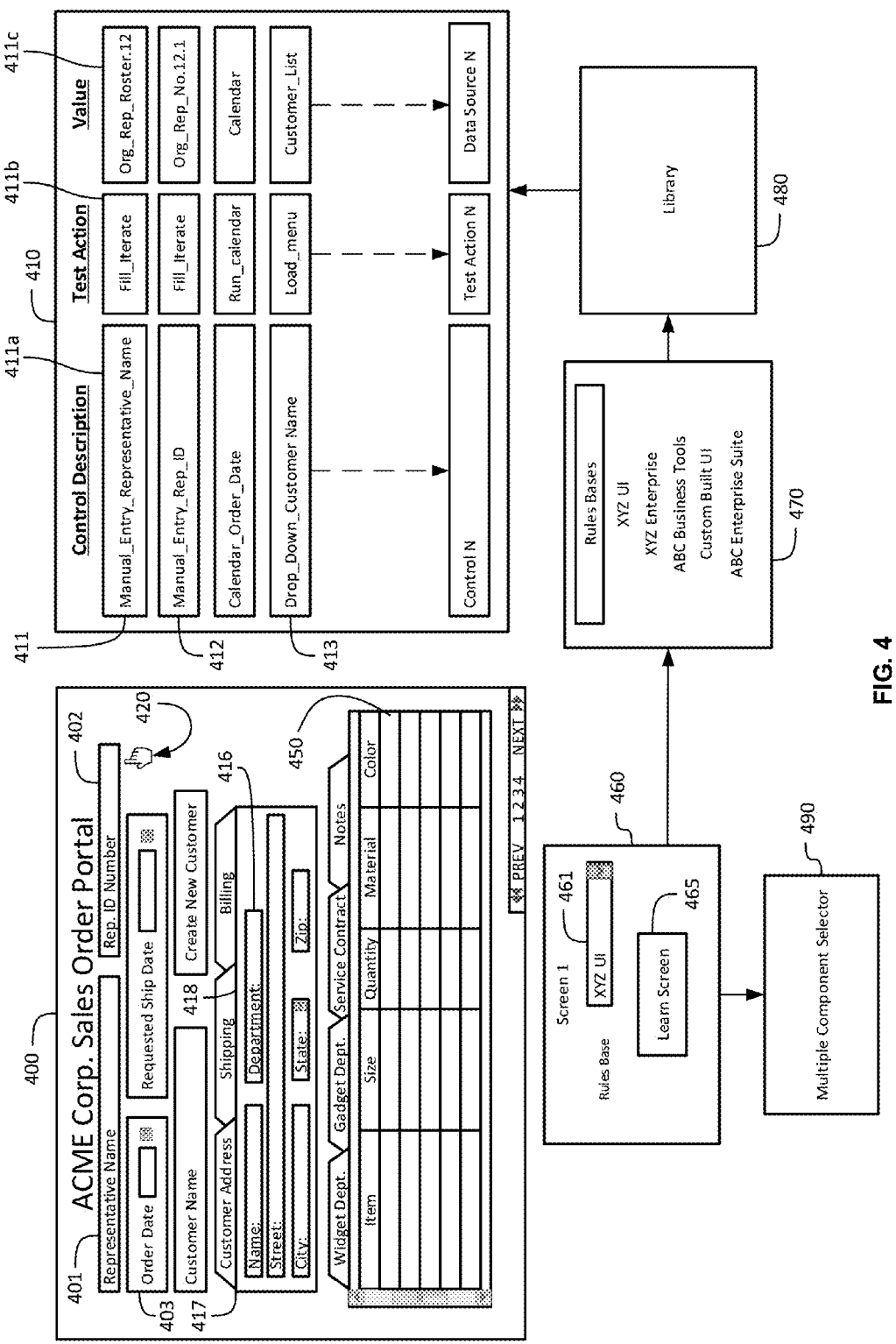
FIG. 4 depicts an application screen and a user interface that may be used to create a test component according to aspects of the disclosure.

In embodiments of the present disclosure, there are several ways to automatically (rather than manually) create test components, all of which may be generated by the control analysis engine 306 and a rules base 312. Rules bases will be described in more detail later in this disclosure. One way to automatically create components in creation mode is to use existing control repositories and a rules base. This is known as "batch mode" and will be described later in the disclosure. Another way to automatically create components in either creation mode or maintenance mode is to use a "learn screen" function of a capture engine, which also uses a rules base to learn the screen and create the component. A third way is to use a component editor, which is shown in FIG. 4. FIG. 4 shows a user interface 410, known as a component editor. The component editor 410 may be shown alongside, or in an overlapping manner, in relation to an application screen 400. Alternatively, the component editor may not be visible (e.g., hidden or running in the background). When a user clicks on a control, such as the manual entry field 401, a corresponding test step 411 may be displayed on the component editor. For each control that a user selects, a corresponding test action and value may appear on the component editor 410. A user may select all of the controls on a screen or the controls on a selected area of the screen, thereby using the component editor 410 to create an entire test component. As shown, a test step may comprise a description of the control 411a, a test action 411b, and a value 411c. It is contemplated that the test step may be comprised of some additional fields, such as an output, a plain-language description of the step, or other fields that are relevant to the particular step. The actual function of the test step 411 shown in this example, when executed, may iteratively fill (test action 411b) the manual entry field containing a representative name (control description 411a) from a list comprising representative names (value 411c, which in this instance is parameterized, meaning that it pulls data from a column of representative names in a test data repository.)

The component editor 410 may allow a user to manipulate individual steps or parts of steps. A user may drag steps to change the order, or may change a name of one or more of the parts of the step or description, or add or delete steps. Another visual display other than the component editor 410, such as another pop-up window, can be used to select additional controls to include in the event that one selectable area on a screen may be associated with multiple controls. Although the component editor 410 depicts the test steps in rows, it is contemplated that other ways of visually displaying the component editor 410 may be implemented, such as through different layouts, such as icons, buttons, or other images, or in different orders, such as top to bottom, right to left, displaying one step at a time, etc.

Rules Bases

Another aspect of the disclosure is that the control analysis engine 306 of FIG. 3 may select an appropriate control description (e.g., 411a), an appropriate test action (e.g., 411b), and an appropriate value (e.g., 411c) according to a particular rules base, such as those stored in rules bases 312. A rules base, for the purposes of this disclosure, is a set of rules, logic, algorithms, or other instructions that associates types of controls with actions, for a particular type of software platform or technology. The rules base may identify how to parse the control repository and what controls to create steps for. One important function of a rules base is to tell the control analysis engine 306 how to associate actions with individual controls or control types (also known as control classes). Examples of control types include displays, fields, and buttons, among many others. This association is accomplished by analyzing the controls. The control analysis engine 306 may look at the controls captured by the capture engine 305, or at a previously stored control repository and may analyze each control based on an appropriate rules base in order to decide what kinds of test actions to associate with a particular control or control types. In addition to associating test actions with particular controls or control types, the control analysis engine 306 may also use the rules base to sub-categorize each control based on particular properties. Examples of properties include the color of a control, how big it is, whether it is editable or non-editable, and what is stored in it. There may be hundreds of particular properties associated with a given control or control type, which may have been programmed by the developer who created the control. By using a rules base to sub-categorize controls based on their properties, more appropriate test actions can be associated with controls. For example, if a control were to be classified by the control analysis engine 306 as a "field," with a property of being "editable," the rules base may associate the action of "enter," whereas if the control was a "field" and "non-editable," the rules base would associate a more appropriate action of "verify."

A rules base may also determine what values or arguments should be associated or created for the control and action combination. The term "argument" may be used interchangeably with "value." As defined previously, a value or argument may be a constant or may be a parameter. The rules base may also create the parameter tied to the test data argument (the argument that carries test data from the test data repository to the step) and then name the parameter tied to the test data argument. Further, the rules base may determine the ordering of steps, the scope of the regions on the screen, and the scope of the components by region. For example, it may be desirable to have one component per region in some instances and more than one component per region in other instances. Additionally, the rules base may determine alternative versions of test assets to create. A given rules base may comprise a large library of rules based on known and widely used enterprise software solutions, user interfaces, custom, and purchased applications, among other types of software platforms. For example, as discussed previously, many companies use and customize software applications provided by SAP, Oracle, Salesforce, and other vendors. Though there are similarities between the platforms, each of these companies has developed their own versions of applications, each of which contain variations on terminology, naming conventions, syntax, control types, and even programming languages. To begin with, a rules base may identify the hierarchy or layout of regions, and individual controls on a screen. Various software platforms are organized differently, so a rules base can determine what sections of a screen contain which individual controls. Then, the rules base is used to analyze what kind of test action is appropriate for each control type or control type and associated parameter values. In order to properly identify what a control in an SAP application might require in a test step versus what a similar control in a competing Oracle application might require, either a single extensive rules base can be used, or a separate rules base can be used for each application. An advantage to using a rules base is that no matter what the differences between the user interface controls or screen layouts between various platforms, the rules base can translate back to the appropriate actions, parameters and arguments in the component editor and other user interfaces of the present disclosure.

It is contemplated that rules bases for well-known enterprise and other packaged software providers may be implemented in many embodiments of the present disclosure. For example, rules bases corresponding to various versions of SAP's products, SalesForce's products, Oracle's products, and others may be implemented, because those companies' products are widely known and used, and therefore well-tailored rules can be included in rules bases used in embodiments of this disclosure. However, it is also contemplated that rules bases may be implemented for any kind of software application, including those created by less well-known providers, and custom-created, in-house software applications. In these cases, rules bases may be more generic and have more default rules rather than specially-tailored rules, but this is not necessarily so. A rules base, according to aspects of the disclosure, provides rules and logic that analyze the particularities of the UI and screen layouts of an application to provide consistent test asset creation and maintenance across different software platforms and technologies. Using a rules base is advantageous to end users of test automation because a class-based framework for test automation (of which the tools of the present disclosure are a part) has been difficult to use and highly technical in the prior art. One of the greatest benefits of rules bases is that it makes the process of component creation dramatically faster. Further, rules bases make component creation far easier than in the prior art. A user can now simply select from a list of rules bases without needing to understand the intricacies of each software platform and how to associate the most appropriate actions with each control. Rules bases, in conjunction with other aspects of the disclosure such as the multi-component interface and the learn screen function, allow users to create more complete components than they could via manually selecting components and manually associating test actions. Screens may be tested multiple different ways with just one component, resulting in fewer components to update overall. Because the rules bases make the terminology consistent, it becomes easier for a user to read, recognize, and interact with, and one user can automate testing across multiple platforms. For example, a large company may have 250 different applications across the organization from multiple vendors. A single tester may then automate tests across all of them using one or more rules bases rather than just working on a few software platforms with which he or she is intricately familiar. Faster, easier, more complete, and consistent automated testing also reduces overall utilization of resources, making test automation less expensive for companies. In certain embodiments, the rules bases may be stored in configuration files, such as configuration files 320 in FIG. 3. It is contemplated that various configuration files may be loaded and unloaded into a particular automated software testing system. A rules base may also be associated with a library 313, which may contain many blocks of code corresponding to particular testing actions and number/type of arguments, among other things. Aspects of this disclosure provide for dozens or more rules bases; however, a particular user may only need a subset of these bases for the types of software that they test. For example, user may have some Oracle applications and some SAP applications, and therefore would need between 1 and 12 rules bases depending upon the application modules utilized. Even within one company's technology, the enterprise software platforms might have several types of user interfaces requiring multiple rules bases. These configuration files may be provided as modules, downloads, or on a disk or drive.

Still referring to FIG. 4, the component editor 410 (via the control analysis engine) may create an entire test component in automation mode as a user clicks through each control on the application screen 400 with a manual cursor 420. The test steps may appear in the order that a user clicks on the corresponding controls. For example, the user may click on the control 401 first, which corresponds to test step 411, then click on the control 402 second, which corresponds to test step 412, then click on the control 403 third, which corresponds to test step 413, and so on. A user may then use the component editor 410 to change the order of test steps by clicking and dragging steps within the component editor 410 interface. A user may desire to change the order of steps for a number of reasons. For example, a user may want to ensure that if one particular control is used before another particular control, each control still works. The user may also delete test steps for whatever reason. A user may also add steps. A user may want to add steps in instances where a particular control could be tested multiple ways, such as with control 403, in which a user could either manually enter numbers as a date, or could select a date from a date-picker calendar tool. The component editor 410 may initially assign one test step to test the date-picker calendar tool only, and a user may add a test step for that control to also test the action of manually entering the numbers. Additionally, users may want to change the names of the control description or parameter of a step so they are more descriptive or easier to understand.

In some embodiments of the disclosure, a test component may be tied to a particular region of a screen rather than an entire screen. For example, the control 450, which is an entire grid, may have its own test component. Assigning particular regions of a screen to one test component may be advantageous, especially when that region is used by some test assets and not by other test assets performing testing upon that screen, and thus is only needed as needed, reducing test execution time and test complexity. Assigning regions to one component also allows for components to be reordered in order to process the screen regions in different orders, thus meeting different testing needs with a reduced number of components. This also allows for one or more components to be easily iterated without iterating the other components in the test asset, thus matching how the screen needs to be tested.

In some embodiments of the disclosure, in order to make sure the proper test steps are created in a test component, a user may have the option to select the proper rules base. FIG. 4 shows a screen 460 which may be visually displayed to a user. This screen 460 may have a selector tool 461, such a drop-down menu. This screen may be displayed as a pop-up window on top of the application screen 400, for example. In other embodiments, the screen can be a visual display that is part of the component editor 410. In this particular embodiment, the screen 460 has the "learn screen" option 465, which can be used in order to automatically create the entire test component as an alternative to clicking on the screen with the manual cursor 420. The learn screen option 465 may also result in the display automatically appearing as shown in component editor 410 with a default set of steps selected or created.

Figure 4B:
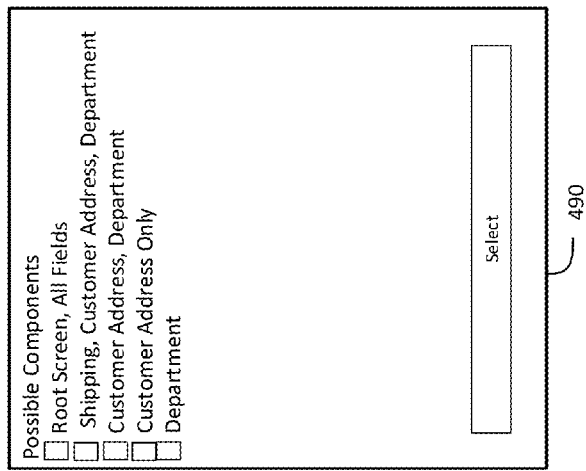
FIG. 4B depicts a multiple component selection window to modify components according to aspects of the present disclosure.

Alternatively to the default selection of steps, another aspect of the disclosure is a multi-component selection window 490, shown in FIG. 4B. In embodiments utilizing this multi-component selection window 490, after a rules base is selected and the learn screen button is clicked, the window 490 may display a choice of multiple components. A user may then select one or more components to actually create. Multiple components are displayed to a user because when the entire screen is learned, multiple controls may be associated with a particular location on the screen. For example in FIG. 4, the location that displays the "department" field 416 is also associated with the "customer address" tab 417 behind it, and also the "shipping" tab 418 behind the customer address tab 417. A user may choose to select one, some, or all of the components displayed in the multi-component selection window, thereby making the tests very specific or very thorough.

Figure 4C:
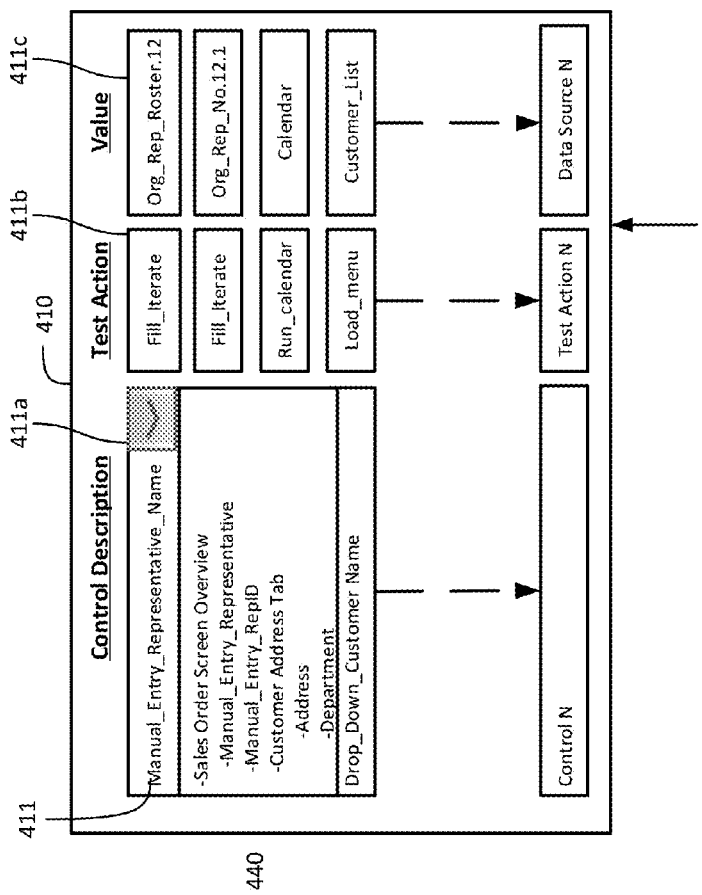
FIG. 4C depicts a how a particular step in a component may be edited through a drop-down menu according to aspects of the disclosure.

Another aspect of the disclosure is that in the component editor 410, a user may change a particular step in a component if the user desires a different control associated with a location on the screen than the one that has been provided. Referring to FIG. 4C, shown is the component editor 410 of FIG. 4, but with a drop-down menu 440, which may display all possible associated controls in a "tree view," showing the controls in a hierarchy. A user may choose to edit the component by selecting a different control description for various reasons. For example, it may be more important to a user to test a different control than the one selected.

Referring back to FIG. 4, the screen 460, which allows a user to select a rules base and learn a screen, may have additional options which are not shown. For example, the user may be able to specify a particular area of a screen, or an entire application screen for which an appropriate rules base should be applied. Depending upon the application, the rules base may be automatically selected for the user. This option may be useful in cases where a user may not know which rules base to choose, for example. Whenever a rules base is chosen, either through the selector tool 461 or otherwise, the rules base may be accessed from a list rules bases 470. It is contemplated that the list of rules bases 470 may not be visible to a user in a table as shown in FIG. 4. That is, the list of rules bases may only appear in a drop-down menu; the list of rules 470 is for illustration purposes only. As shown, the list of rules bases has several different types of rules bases, such as "XYZ Enterprise" and "ABC Enterprise Suite," to reflect the different options the particular user has at their disposal in this example. A user may have multiple rules base per application or one rules base that covers multiple applications. An arrow between the file of rules bases 470 and the library 480 illustrates that once a rules base is selected from the list of rules bases 470, the particular rules base may reference the library 480 in order to associate the appropriate test actions and values with the correct control descriptions.) The steps to create a visible component, as illustrated in FIG. 4, may comprise selecting controls on an application screen (either through the manual cursor 420 or the learn screen option 465), selecting a rules base (either through a selector tool 461, or automatically), accessing a rules base from a file or rules bases 470, using the selected rules base to reference the library 480, associating the appropriate testing actions and values from the library 480 to the selected controls, and then visually displaying the created component on the component editor 410.

Figure 5:
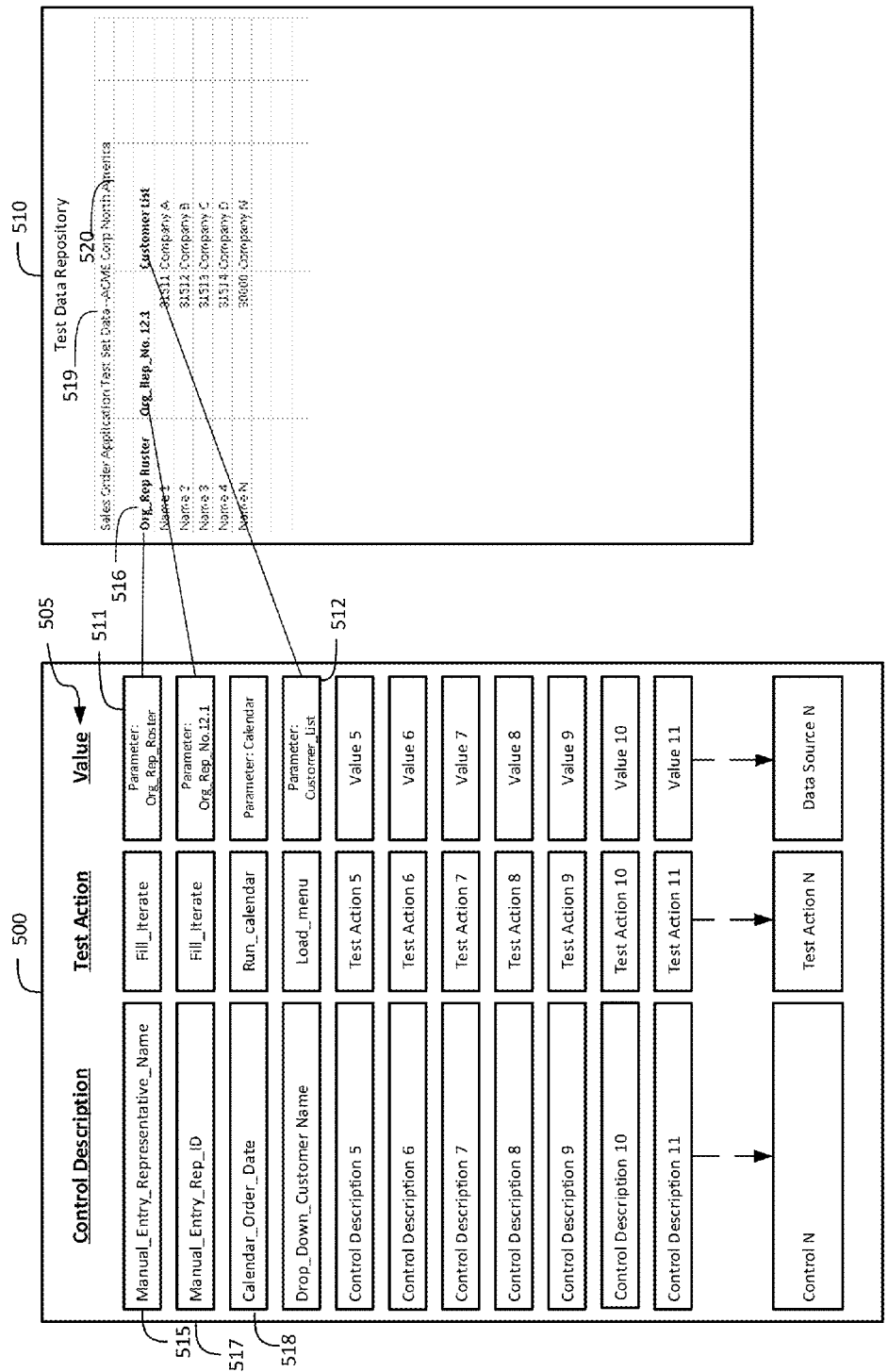
FIG. 5 depicts a test component and an associated test data repository according to aspects of the present disclosure.

Yet another aspect of the disclosure is that these automatically created and updated test components may be data-driven, and the data sources from which individual test steps retrieve their data may be automatically "parameterized" and included in a test component. FIG. 5 illustrates a test component shown in a column and row visual format. In the test component 500 shown, one of the columns depicts value column 505. In each step, the value column can contain a "test data parameter" or other arguments as described previously. Though parameters have been described earlier in this disclosure, for purposes of specificity, the particular parameters described here will be referred to as "test data parameters." The value column 505 references what the test data parameter name is; for example, test data parameter 511 is "Org_Rep_Roster" and test data parameter 412 is "Customer_List." These test data parameters refer to columns in an associated database 510 (which may also be known as a data sheet or a data repository). In most embodiments, the name of the test data parameters and the names of the column headers match exactly. These data repositories may exist in any kind of database, workbook, or repository file type, such as a Microsoft Excel workbook or a .csv file. In general, the columns that are tied to the test data parameters may contain a plurality of individual rows of data (also known as data scenarios) that may be run through the controls in each corresponding test step in the component or test asset. For example, the test data parameter 511 which references the column "Org_Rep_Roster" 516 may run values corresponding to the name of a representative listed in the rows of the column through the control being tested by step 515.

The "parameterization," or association of a test data parameter with a control description, may be automatically determined by the rules base. That is, a rule within a rules base may identify that a particular data input parameter should be created for a particular control. This automatic parameterization, therefore, links controls to appropriate data repositories, which enables making the test steps and test components data-driven. Additionally, the names of the data input parameters may be automatically assigned from the properties of the control For example, they may be assigned with the label or name property of the control.

In some embodiments of the present disclosure, individual data input parameters may be edited by a user. A user may also designate certain parameters as required or optional, or may designate other properties to the parameter based on individual user needs. These designations may be made through easy-to-user interface options, such as drop-down menus.

Comparison Engine

Figure 6:
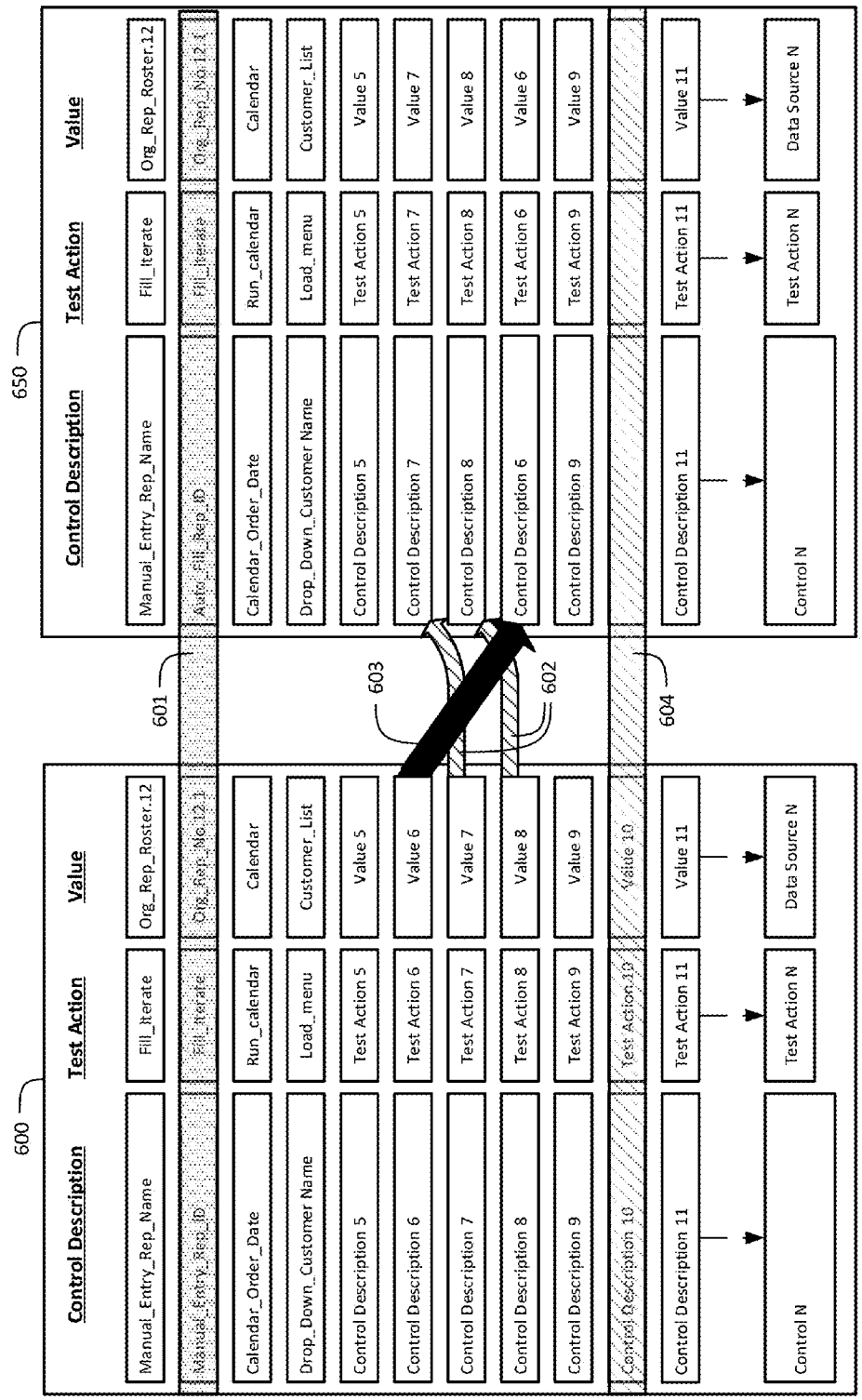
FIG. 6 depicts how a newly generated test component and a prior version of a test component may be compared according to aspects of the present disclosure.

Turning now to FIG. 6, another aspect of the present disclosure is that users may compare newly created test components with previous versions of test components when testing a new version of a software application while in maintenance mode. This comparison may be implemented by the comparison engine 307 shown in FIG. 3 and, which may graphically display new test components against previous test components to a user. Comparisons may be made on a step-by-step basis. If a new test asset differs from a previous test asset, it may differ in several aspects, as will be illustrated presently. In some embodiments, the comparison engine may present a graphical display comparing new test assets to previous test assets in an easy-to-read, user-friendly interface. For example, a table or icon with plain English descriptions may be presented. In FIG. 6, a previously existing test component 600 is depicted on the left and a newly created test component 650 is depicted on the right. In the prior art, identifying and "viewing" test components and any changed steps might comprise comparing lines of tables one by one, or even reading lines of code written in a computer programming language in order to find the sections that constituted the control description and the testing action. Previously existing tables, and certainly lines of code appear cryptic to those who don't know computer programming, and identifying such test assets would be difficult. Even for those who are proficient in computer programming, identifying differing parts of test components is, at the very least, tedious. The graphical display comparing new test assets with previous test assets may allow a user to see what test assets have been updated by comparing new test assets and previous test assets side-by-side, as shown in FIG. 6. Other embodiments of the graphical display are also possible, such as showing the test assets top to bottom or right to left. In other embodiments, the view may comprise showing the test assets side to side or top to bottom with an additional part of the display, often called a wizard, dedicated to showing specific information about the nature of a given step change, including the ability to accept or reject the change and the ability to move from one step change to another. Another graphical display embodiment may not show the side to side or top to bottom asset comparison view, but only shows the wizard display described above. In some embodiments, a user may have an option to either accept or reject the changes. In other embodiments, the changes may be automatically approved without any input from a user. In the embodiments wherein the changes are approved without input from a user, the acceptance may be automatically determined by rules stored by the comparison engine. These rules can be loaded and unloaded and may be tied to the rules base.

Still referring to FIG. 6, another aspect of the present disclosure is that the comparison screen may allow a user to see easily and specifically which aspects of a test asset may have been updated. For example, a color coding bar 601 shows that a control description, and possibly the control itself has been updated or changed. Other color coding or highlighting may be used to show that a testing action has been updated or changed. Other graphical notifications are also possible, such as notifications that an object has been deleted or had its position moved. For example, an arrow 603 shows that one step has moved downward in order, and other arrows 602 show that two other steps have been move upward. If a test asset has been completely deleted, a notification may show that as well, such as by the color-coded bar 604. In some embodiments, when a test asset has been modified, a user may be presented with an option to manually edit the test asset instead of selecting an outright rejection or acceptance. For example, if a user sees that a test step has been changed, and specifically, that a testing action of the test step has changed, the user may choose to manually edit the particular testing action. It is contemplated that this option would most likely be utilized by a user with specific programming knowledge.

Updating Multiple Components

When a particular test component that requires updating is encountered, and once changes to the test component are accepted (either automatically or by user approval), the updated version of the test component is saved to the original corresponding test asset repository, which will be described in further detail presently. This saving step is performed by the update engine 308. A test asset repository may be a database, workbook, or repository file in any format, stored in a memory, which stores all types of test assets, including test cases and test sets for future use in test automation. Even in the prior art, a test asset repository is a useful resource, often created by the testers of the original software application. In prior art systems of test automation, the test asset repository is useful for reusing test assets when the software application is updated. However, test assets in the test asset repository will need to be updated to reflect changes when the software application to be tested is updated. For example, a test asset repository for a software application in version 1.0 may contain test assets that are mostly still usable for software application 2.0, but perhaps 85% of all the test components are usable and 15% of the test components require updating throughout the test cases and test sets that inherit the test components. Once the test assets are updated, a user would want to save a complete, updated test asset repository 2.0 for reuse on the next software update (e.g. software application 3.0). In the prior art, updating each instance of a new test asset would require manually identifying not only the first components to be updated, but also all other similar components throughout the test cases and test sets. In some instances, there may be dozens or hundreds of components to manually update.

Figure 8:
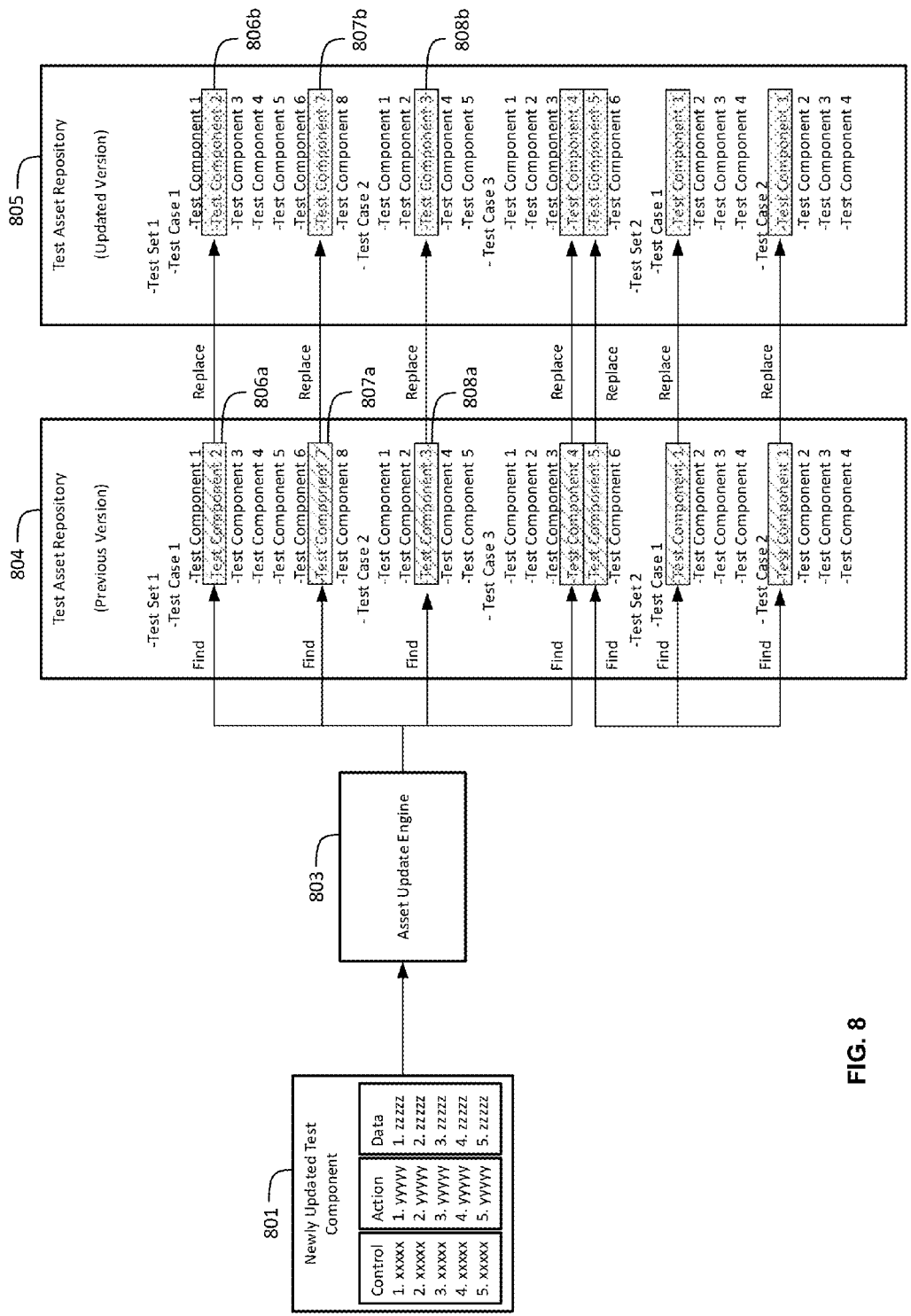
FIG. 8 depicts how multiple test assets may be updated according to aspects of the present disclosure.

In embodiments of the present disclosure, an existing test asset repository may be queried by the asset update engine 309 of FIG. 3 to identify test components that are substantially identical to the test component that was just updated. FIG. 8 shows a newly generated test component 801, which may be similar to the newly generated test component 650 of FIG. 6. Often, because of the nature of existing enterprise software, a single application may have the same screen utilized several times throughout different business process flows in the application and across different versions. As a result, each of these screens may use the same data-driven components. Therefore, the same components may exist in multiple test cases and test sets. The asset update engine 803 (which may be similar to the asset update engine 309 of FIG. 3) can recognize and update all of them by querying the test asset repository 804. As shown, the asset update engine 803 recognizes the newly updated test component 801, and may also recognize the previous version of that test component. Then, the asset update engine can query the test asset repository 804 which contains the previous version of the test component. As shown, test asset repository 804 contains multiple test sets, each with subsets of test cases and test components. The asset update engine 804 may find each component that requires updating; for example, test components 806a, 807a, and 808a. Then, it may take the newly updated test component 801 and use it to update all the prior components to the newly updated test component 801. Test asset repository 805 shows the updated version of the test sets and test cases, and updated test components 806b, 807b, and 808b. The previous version of the test components in test asset repository 804 shows previous versions of test components highlighted in a first shade, and the updated version of the test asset repository 805 shows the updated components highlighted in a second shade. It is contemplated that in many embodiments, the test asset repository may not be visible to a user, and may be updated in the background. Although the test asset repositories 804 and 805 are both depicted, there may be only one test asset repository, and the updated version 805 may replace the previous version entirely. The updated test asset repository 805 may be used in future tests.

Figure 9:
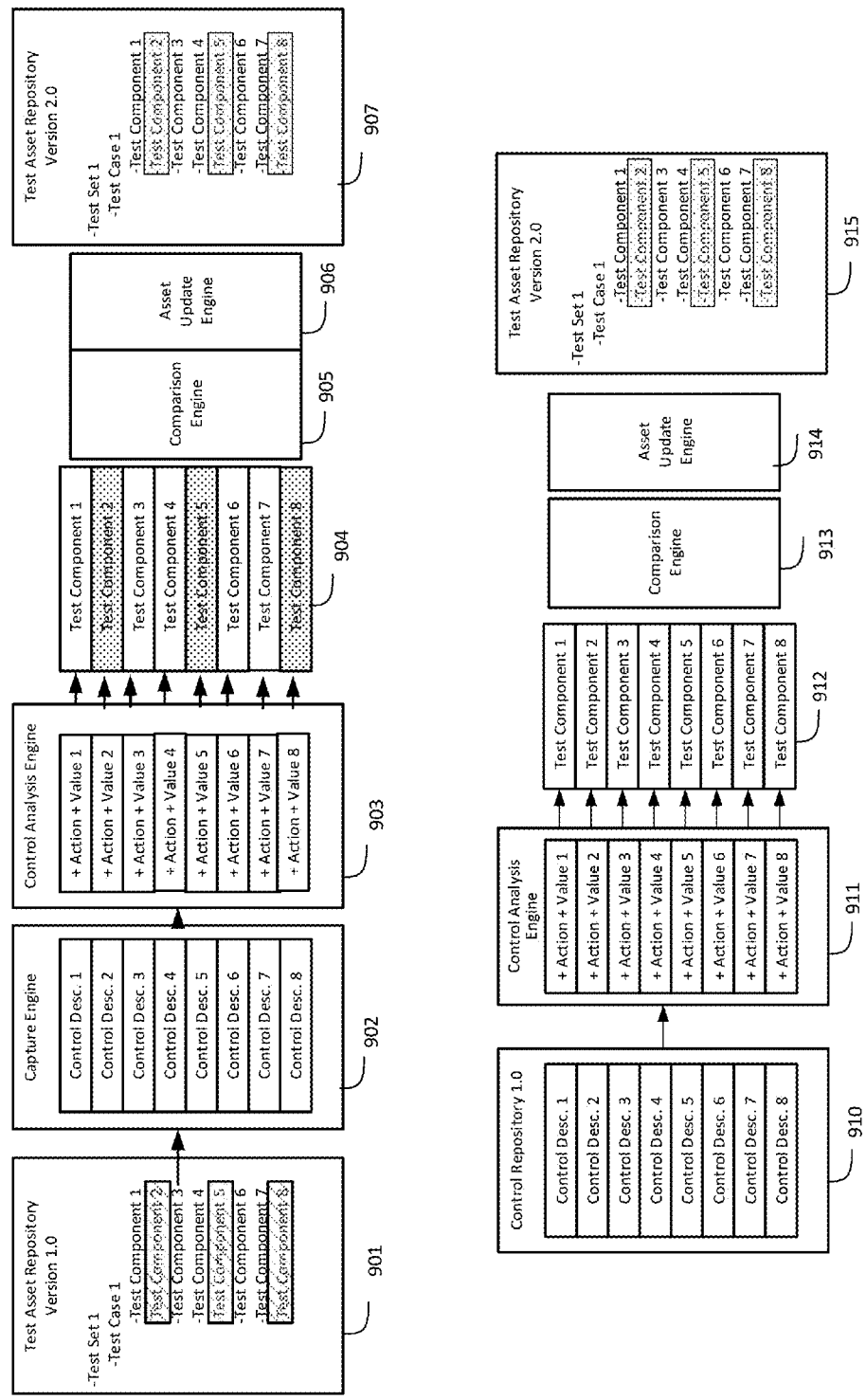
FIG. 9 depicts how multiple test assets may be created in a batch mode according to aspects of the present disclosure.

Another aspect of the disclosure, which may be referred to as "batch mode," which is depicted in FIG. 9. The functional blocks described in FIG. 9 may be similar to their counterparts in FIG. 3. Batch mode allows the asset update engine 905 to update numerous test assets throughout the application in batches. This mode made also be referred to as "headless updating." In one embodiment, multiple application screens (and their control descriptions) may be captured by the capture engine 902, and then the capture engine 902 may provide the control descriptions to the control analysis engine 903, which can automatically produce a test component for each control description received. This step can be performed without intervention from a user. That is, the user interfaces shown in FIG. 4, showing individual application screen 400, and component editor 410, may be bypassed entirely. In this mode, application screen identifiers are used to automatically open prior test components from test asset repositories. As depicted in FIG. 9, in a first step, the capture engine 902 may directly capture control descriptions from the test asset repository 901. This is one step that may be done automatically without user intervention. As depicted, there are control descriptions for each test component 1-8 in the test asset repository 901. Of course, a test asset repository for an application may contain many more test sets, cases, and components than depicted here. The control descriptions 1-8 may be analyzed by the control analysis engine 903 (which may implement a rules base and/or library automatically), which associates at least a test action and a value (or parameter) to each control description 1-8. The output of the control analysis engine 903 are test components 1-8. In this example, test components 2, 5, and 8 are highlighted to represent that they are newly generated and updated from the previous corresponding components, which are highlighted in a different shade in the test asset repository 901. Newly updated components 904 will be compared by comparison engine 905 with the prior components identified using screen identifiers from asset repository 901. This comparison step may be done automatically, without user intervention, in contrast to the comparison described in FIG. 6. Updates are also automatically performed without user intervention using the asset update engine 906 and saved in the test asset repository 907. It is contemplated that test asset repository 901 and 907 are actually the same repository, but they represent versions 1.0 and 2.0 of the test sets, cases, and components. Application screen identifiers may be used both to recognize the components from version 1 of the repository 901 and to identify which components that need to be replaced in version 2 or the repository 906.

Alternatively, another way that batch mode may be implemented is by using entire files of previously captured control descriptions. That is, control repositories, such as control repository 311 from FIG. 3, discussed earlier in the disclosure, can be used to identify entire application screens within a test asset repository, rather than using a capture engine to initially identify the control descriptions. FIG. 9 shows a control repository 910 that already contains control descriptions 1-8. As discussed previously in this disclosure, control repositories may already exist for a variety of reasons, such as they were created to be used by prior test automation systems. If a control repository 910 is available, it may be advantageous to utilize this embodiment of batch mode in order to save time by omitting the step of using a capture engine to capture control descriptions from a test asset repository. As depicted in FIG. 9, in this embodiment of batch mode, the control analysis engine 911, the test components 912, the comparison update engine 913, the asset update engine 914, and the test asset repository 915 correspond to functional blocks 903-907 depicted above. It is contemplated that the asset update engine 913 may still use an application screen identifier in order to identify which components need to be updated in test asset repository 915. If a corresponding component is not found in the test asset repository 915, the test component is simply added to the test asset repository as a new component.

Figure 10:
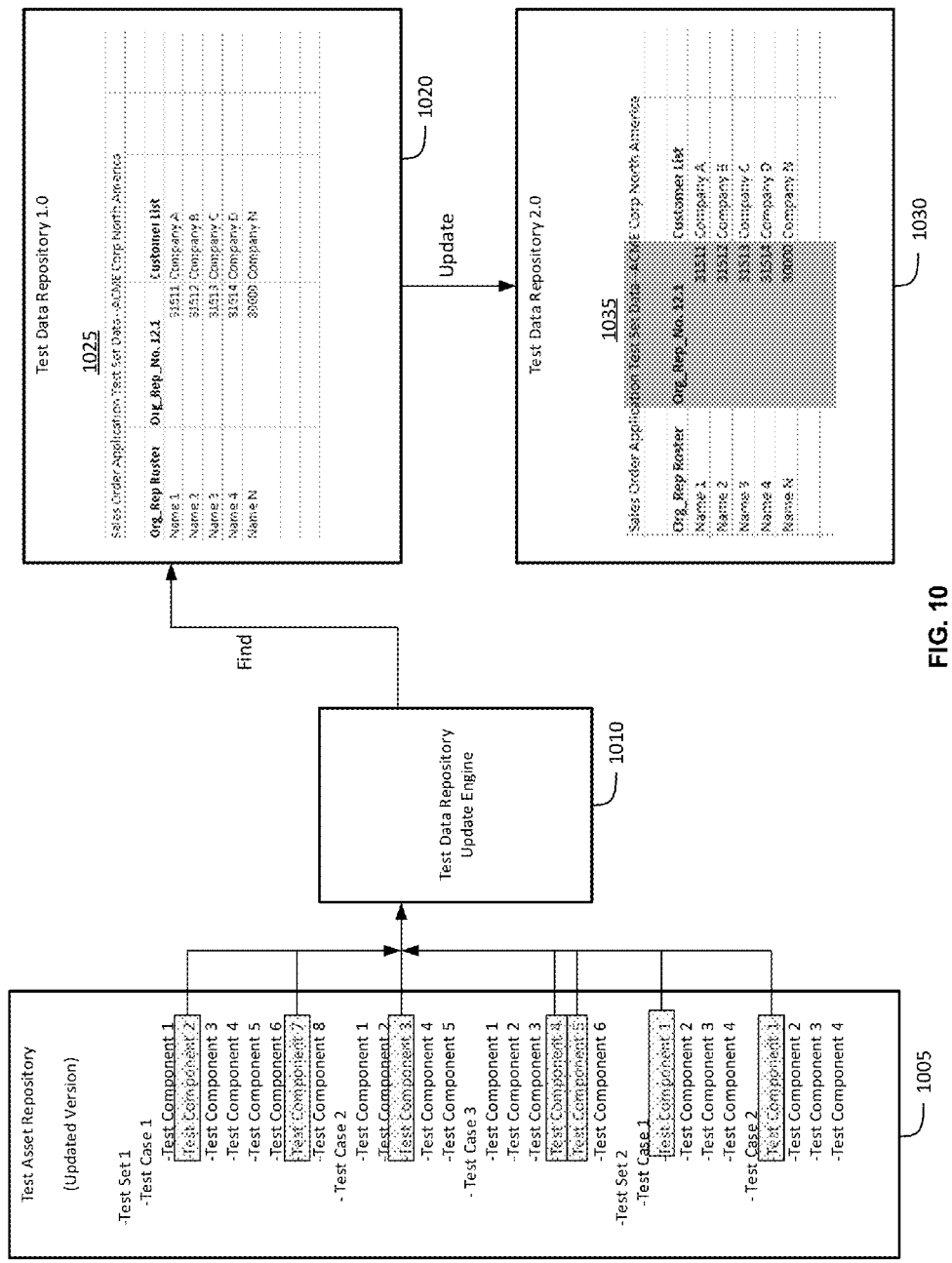
FIG. 10 depicts how test data repositories may be updated according to aspects of the present disclosure.

Another aspect of this disclosure is that because certain components contain values (or arguments or parameters) that are updated, the corresponding test data repositories that the values refer to may also require updating. For example, referring back to FIG. 5, if the parameter 511 may be changed in a number of ways. The entire test step 515 might be deleted, causing the column to be unnecessary, and perhaps requiring that it be deleted or marked as deleted. A change to the control of step 515 or the action of step 515 might require that the value refer to a different column of data entirely. In these various scenarios, at least the name or the format of a column, such as column heading 516, may require a change. FIG. 10 shows how test data repositories may be updated by a test data repository engine 1010, which may be similar to data repository update engine 310 of FIG. 3. A test asset repository 1005, which is updated with test components are shown in test asset repository 805 of FIG. may have a particular test data repository associated with the updated test components. The test data repository engine 1010 may look at the updated test components and find the corresponding data sheet in test data repository 1020. In this example, the data sheet may have one column 1025 that requires deletion in the new data sheet to be stored in the updated version of the test data repository 1030. Therefore, in the new data sheet, column 1035 may be highlighted, indicating that it requires deletion. It may not actually be deleted until the user specifies so, because the data may need to be saved. The highlighting of the column 1035 is just one example of how a data sheet may be updated. As discussed earlier, columns can be moved, renamed, added, or otherwise changed.

Referring back to FIG. 5, a change to the control of step 515, such as the label of the control changing, might require a change to the name of the column header 516 in the test data repository 510. A new step might be added above 515, which might require the addition of a new column in the test data repository 510 to the left of column 516. If the controls for 517 and 518 move locations on the application screen, the steps 517 and 518 may need to switch positions in the component 500. This might require that columns 519 and 520 to switch positions with each other in the Test Data Repository 510. In these various scenarios, at least the location or the format of a column, such as column heading 516, may require a change. In embodiments of the present disclosure, the data repository update engine 310 of FIG. 3 may access the test data repositories 315 and update the column headings, such as column heading 516 based on any associated updates to values or parameters, such as parameter 511 may access the test data repositories 315 and update the column headings, such as column heading 516 based on any associated updates to values or parameters, such as parameter 511. In other embodiments, the data repository update engine may also make changes to the rows of data in the columns, such as by removing the rows or replacing the data in the rows with correct data. Additionally, in other embodiments, test data repositories themselves may be automatically created by analyzing the test asset repositories. For example, a data repository update engine 310 may look at the test sets, test cases, and test components and discover what columns are required, and use the names of the columns to create data sheets in the test data repositories 314.

In some embodiments of the disclosure, once the columns are updated by the data repository update engine 310, a report may be generated of all the locations in the test data repositories in which the columns are updated. The report may then be displayed to the user. An advantage of displaying the report to the user is that a user may need to provide new data for certain columns that have been updated by the data repository update engine. For example, if a certain column previously required invoice numbers, but once updated, required customer names, a user would be able to provide the necessary customer names in order to keep the component functioning as a data-driven component. A report further increases the ease of use of the testing automation system for a subject matter expert. In some embodiments, a report may be added to the test data repository 510 which includes a list of in a user-accessible location that, when clicked, automatically displays the linked table or page, tab, and/or column that has been updated. This feature is advantageous because certain data repositories associated with test cases and test sets may comprise multiple pages or tables, tabs, or columns.

Certain embodiments may also include scripting functions. One scripting function, for the purposes of this disclosure, may include providing an application program interface through which another application may analyze a generated test component to identify and modify the test steps, the associated controls and the test actions. This feature may allow a program that has certain known test automation features to capture and utilize the test components created by the methods of the present disclosure even if the other programs do not have a rules base or the ability to automatically create test components themselves. The outside program may then perform various functions or operations as needed based on the test components. This scripting function may be known as an API call scripting function. An API call scripting function may be useful because other test automation programs may have control repositories, test asset repositories, and the ability to execute test actions, but cannot automatically create or modify test components. Other programs may make API calls to the functions that create, compare, or modify test components, which allows technical users to build additional functionality beyond the systems of the present disclosure.

Another scripting function may be known as a "save-and-execute" scripting functions. A save-and-execute scripting function may allow technical users to save scripts that they build within the system for repeated use in the future by technical and non-technical users alike. Created and saved scripts may then be executed by other test automation execution software. As an example, some known test automation execution software runs scripts written in the Visual Basic programming language. Technical users may write a script in Visual Basic and save it in embodiments of the present disclosure. Such scripts may then be displayed to the user via a list in the user interface. If a user later selects to execute the script via the user interface list, the script may be loaded into an external test automation software and executed.

There are a variety of scripts that may be created both through the API call scripting function and the save-and-execute scripting function. Additionally, the two scripting functions can often be used in conjunction with one another. One example of a save-and-execute script would be a script that captures actual data from an application screen. This script may be called a "learn data" script, for example. Normally, in embodiments of the present disclosure, only the controls on an application screen are captured, but if this "learn data" script is selected and executed, the system may also capture data actually entered into the controls on an application screen. For example, if there is a manual-entry control field on the screen that has a default or dummy number entered into it, such as "123456789," the "learn data" script may capture that dummy number and save it to the test data parameter in the value for the appropriate step in the component. This particular function may be useful to a user for a number of reasons. One way the user could use this captured data would be to enter it into a data repository and use it in an actual data-driven test. To do this, a user could use the other scripting function, which is the API call scripting function. In this example, once the number "123456789" is captured, a user may want that number to be entered into a data repository. An outside program could call the API of the system of the present disclosure in order to do so. Entering this captured data into a repository might not be part of the base functionality of the present system, but an outside program could call the system's API and gain access to the individual components, steps, values (or parameters) and associated data repositories of the system. Through this access, the outside program could identify which values are associated with the new learned data and automatically update the associated data repositories. In essence, the scripting functions allow other programs to extend the functionality of the system of the disclosure.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

Figure 7:
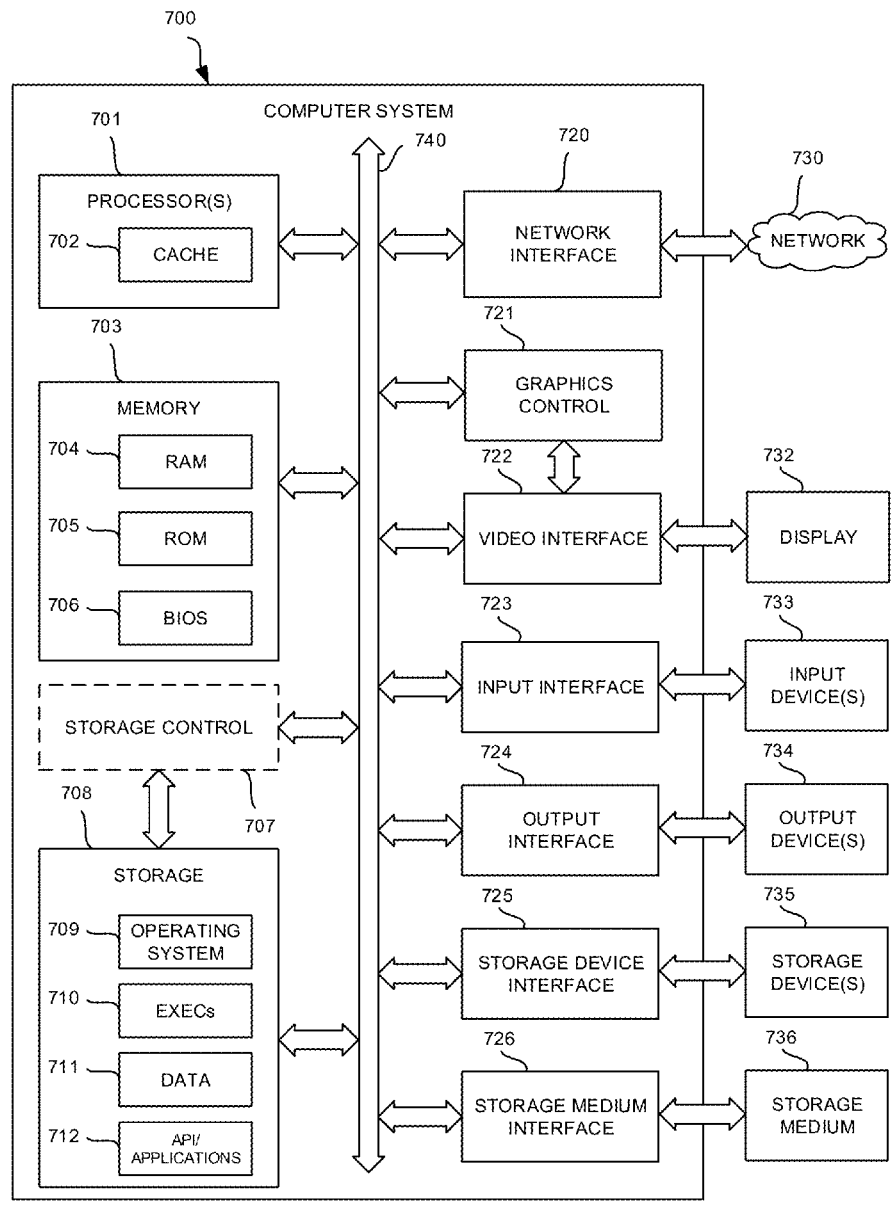
FIG. 7 is a block diagram of a computer that may be used to implement aspects of the present disclosure.

The systems and methods described herein can be implemented in a computer system in addition to the specific physical devices described herein. FIG. 7 shows a diagrammatic representation of one embodiment of a computer system 700 within which a set of instructions can execute for causing a device to perform or execute any one or more of the aspects and/or methodologies of the present disclosure. The hardware 300 in FIG. 3 is one implementation of the computer system 700. The components in FIG. 7 are examples only and do not limit the scope of use or functionality of any hardware, software, firmware, embedded logic component, or a combination of two or more such components implementing particular embodiments of this disclosure. Some or all of the illustrated components can be part of the computer system 700. For instance, the computer system 700 can be a general purpose computer (e.g., a laptop computer) or an embedded logic device (e.g., an FPGA), to name just two non-limiting examples.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for testing software, the method comprising: associating a plurality of controls on a software application screen with testing actions to be performed on the controls, thereby creating a plurality of test steps, wherein each test step comprises at least one test action associated with a control description, generating a test component comprised of the plurality of test steps arranged in an order to be executed, comparing the generated test component to a previous test component that is associated with a previous version of the software application screen, wherein the previous test component comprises a plurality of previous test steps, and each of the plurality of previous test steps comprises at least one test action associated with a control description, detecting one or more changes between the controls of the software application screen and the previous version of the software application screen, displaying, on a user interface, a graphical representation of both the generated test component and the previous test component simultaneously, wherein the graphical representations of both the test components each comprise graphical representations of each test step of the test components, and wherein each test step comprises a graphical representation of the at least one test action and the control description, and displaying, on the user interface, a visual indicator that highlights at least one difference between at least one of the test steps of the generated component and at least one of the test steps of the previous test component.

2. The method of claim 1, wherein one or more of the test steps further comprises an associated value, the value comprising one of:
   a constant, wherein a constant comprises one or more of:
      a character, a string, or an integer,
         to be entered into a field of an associated control every time the test action is executed on the associated control, and
   a parameter, wherein a parameter comprises a reference to a column in a test data spreadsheet, the test data spreadsheet being a separate spreadsheet from the test component, the column in the test data spreadsheet comprising a plurality of different rows of test data to be utilized in conjunction with an associated control over multiple executions of the same test step.

3. The method of claim 1, further comprising:
   presenting, to a user, an option to perform one of:
      accepting the differences, rejecting the differences, partially accepting the differences, and changing one or more of the differences.

4. The method of claim 1, wherein associating the plurality of controls further comprises:
   capturing all controls on a particular region of a software application screen with one click, and
   automatically saving all of the controls in a repository, and wherein generating a test component comprises:
   associating all the steps of the generated test component with the saved controls of the particular region of the software application screen.

5. The method of claim 1, further comprising:
   automatically associating a parameter to one or more of the plurality of test steps, wherein:
      a parameter comprises a reference to a column in a test data spreadsheet, the test data spreadsheet being a separate spreadsheet from the test component, the column in the test data spreadsheet comprising a plurality of different rows of test data to be utilized in conjunction with an associated control over multiple executions of the same test step.

6. The method of claim 1, wherein associating the plurality of controls further comprises:
   using a rules base to assign the testing actions with the controls,
      wherein a rules base comprises a set of instructions in a rules base spreadsheet external to the test components that are customized for software applications produced by a particular vendor, and which utilizes the particular vendor's conventions of identifying controls to assign particular actions from a library of controls and associated actions to particular controls of the particular vendor's software applications.

7. The method of claim 1, further comprising:
   providing an application program interface through which another application may access and analyze the generated test component to identify the test steps, the associated controls, and the test actions, and perform one or more of:
      changing the generated test component, and
      creating a new test component.

8. The method of claim 1, further comprising:
   providing an application program interface for:
      calling an external scripting program,
      loading a script from the external scripting program,
      executing a script generated by the external scripting program, and
      saving the script for future execution.

9. The method of claim 1, further comprising:
   identifying, in a test case comprising a plurality of test components, wherein the test case is associated with a previous version of the software application, any previous test component associated with the previous version of the software application screen, and
   replacing the any previous test component with the generated test component.

10. The method of claim 1, further comprising saving the generated test component in an updated test case in a test asset repository.

11. The method of claim 10, wherein the generated test component comprises at least one parameter, the at least one parameter comprising a reference to a column in a test data spreadsheet, the test data spreadsheet being a separate spreadsheet from the test component, the column in the test data spreadsheet comprising a plurality of different rows of test data to be utilized in conjunction with an associated control over multiple executions of the same test step, and further comprising:
   identifying, in a test data repository comprising a plurality of test data spreadsheets, a particular test data spreadsheet associated with a previous version of the software application, and
   highlighting, in a graphical display, at least one column in the particular test data spreadsheet associated with the previous version of the software application that requires updating.

12. The method of claim 11, further comprising:
   updating the at least one column in the particular test data spreadsheet associated with the previous version of the software application.

* * * * *